April 23, 1957 J. GIESEN 2,790,009
METHOD OF DECOMPOSING LIGNIN AND LIGNIN-CONTAINING
MATERIALS TO PRODUCE PHENOLIC PRODUCTS
Filed March 3, 1953
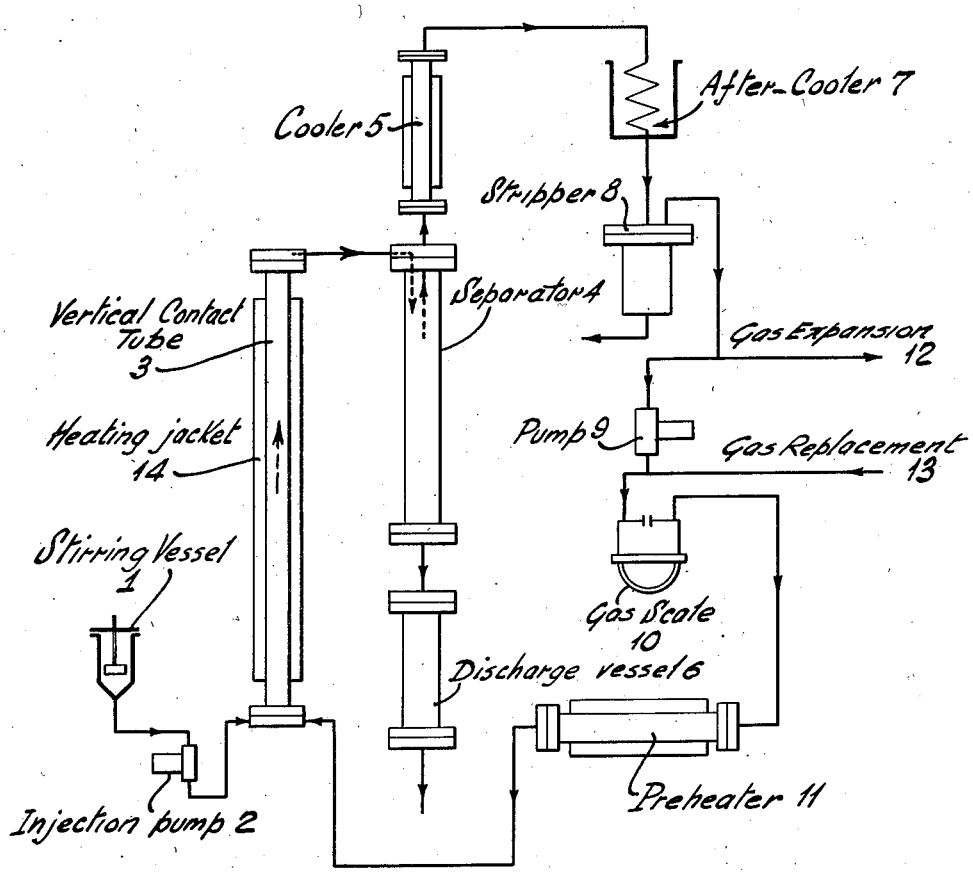
INVENTOR:
Johann Giesen
BY
Morrison, Kennedy & Campbell
ATTORNEYS.

United States Patent Office 2,790,009
Patented Apr. 23, 1957

2,790,009

METHOD OF DECOMPOSING LIGNIN AND LIGNIN-CONTAINING MATERIALS TO PRODUCE PHENOLIC PRODUCTS

Johann Giesen, Haldenstein, Chur, Graubunden, Switzerland, assignor to Inventa A.-G., fur Forschung und Patentverwertung Luzern, Lucerne, Switzerland Application March 3, 1953, Serial No. 340,133

Claims priority, application Switzerland March 5, 1952

5 Claims. (Cl. 260—619)

This invention relates to the subject of decomposing lignin (and materials containing it) and involves a novel method therefor. As is well-known lignin exhibits quite different properties under different conditions, for example, depending on the origin of this compound and the method by which it is obtained, separate from other materials. As one instance, so-called native lignin is soluble in many organic solvents; cuproxam lignin and methanol-hydrochloric-acid lignin also behave similarly.

On the other hand technical lignins obtained by the wood-saccharification process are in frequent cases quite insoluble, and this insolubility indicates that a considerably condensed material was formed owing to an insufficiently careful method of manufacture being used. No suitable use has hitherto been found for this inferior technical lignin, and it is hardly possible as yet to convert it reliably by chemical methods into a useful product.

On a laboratory scale the hydrogenation of soluble lignins has been successful to a somewhat available extent. Thus, Harris and his co-workers obtained, in particular, hydroaromatic compounds and methanol from the aforesaid methanol-hydrochloric-acid lignin. Further, Freudenberg, Lautsch and their co-workers have hydrogenated both soluble and insoluble lignins in aqueous alkaline suspension. By this means they obtained, using palladium as catalyst about 50 percent of phenols, of which about 18 percent (calculated on the lignin) could be distilled. So also, the copper-chromium-oxide catalyst of Adkins, which is hereinafter termed Cu-Cr-O for the sake of brevity, did not, however, produce any practically satisfactory results according to the statements of these experimenters. Adkins himself worked with Cu-Cr-O catalyst in dioxan solution but only with soluble lignins. He obtained hydroaromatic products and methanol. By using the term Cu-Cr-O herein it is intended to indicate that these three elements are present in the catalyst, as in the form of one or another copper chromite compositions, such as are formed by reducing the basic chromate and the dichromate.

It is here noted that whereas the hydro-aromatic products obtained by the aforesaid process or method are of minor importance in domestic life, the non-hydrogenated phenols represent technically valuable products. It is, therefore, an object of the present invention to manufacture from lignin phenolic substances, especially phenols of low boiling point. For this purpose the splitting or decomposing of the lignin molecules may be and preferably is effected substantially by hydrolysis, and the consumption of hydrogen is reduced as compared with the plan of splitting by hydrogenation, which has usually been previously employed.

This result, of producing phenolic substances from lignin, is obtained by the process of this invention, according to which the lignin, in aqueous neutral suspension, is treated with hydrogen at a temperature above about 300° C., and at a pressure above about 350 atmospheres, and in the presence of a Cu-Cr-O catalyst, until up to about 0.9 to 1.8 mol hydrogen has been taken up per 100 g. lignin. Phenols, or the reaction products obtained from the lignin reaction, can be added to the aqueous medium.

By the process of the invention about 95 percent of the lignin becomes converted. In addition to water and gases, there are obtained about 70 percent of products soluble in ether, of which about 50 percent, calculated on the lignin, is distillable at 2 mm. pressure. The distillate consists, to the extent of about 80 percent of phenols, i. e. about 40 percent of the lignin is converted into distillable phenols.

The method according to the invention can be applied to lignins of any kind, and in particular to insoluble lignins obtained by the wood saccharification process, such as, for example, Scholler lignin. Preferably, this lignin, which results from the Scholler process, for example, is obtained with a water content of about 50 to 60 percent, and is then dried in air until it has a water content reduced to about 35 to 45 percent and is then ground to dust fineness, for example, by means of a ball mill.

Referring further to the Cu-Cr-O catalyst, this can be produced in the known manner described by Adkins. Such process, however, is rather complicated and time-consuming if sufficient activity is to be obtained for a good yield. It has now been discovered, however, that the need of separate manufacture of the catalyst can be avoided to the great advantage of the process. This can be achieved by precipitating the catalyst not yet reduced, as a chromate, on the lignin, and then carrying out the lignin decomposition as and under the conditions previously described. It has unexpectedly been found that the catalyst, made in this improved and much simpler manner, and which can also be much more easily reproduced, has the same advantageous effect as the catalyst made by the Adkins process.

The process of this invention will now be described further with the aid of the following examples of procedure, but it is not limited thereto. Presented herewith is a drawing, in the form of a flowsheet and which drawing illustrates diagrammatically an apparatus suitable for use in carrying out the process continuously.

*Example 1*

A mixture is prepared of about 400 g. Scholler lignin having a water content of about 49.4 percent and a content of about 56 g. copper chromate which had been precipitated on the lignin, and about 1,000 cc. of water. These ingredients are heated under hydrogen pressure, as in a three-liter autoclave having a stirrer. The copper chromate, which is precipitated on the lignin by a potassium chromate solution on introducing the lignin into a dilute copper nitrate solution of known content acts in the reduced form as a catalyst. After heating for about 6 to 7 hours at about 320° C. under a hydrogen pressure of 400 atmospheres and subsequently cooling, the reaction product is obtained in the form of a tarry mass which becomes separated from the catalyst by filtering and centrifuging. The product, on being worked up by distillation at about 15 mm. Hg, gives a yield of 46 g. of a phenolic oil which boils between approximately 100 and 250° C. and contains about 75 percent of alkali soluble fractions. By extraction of the aqueous layer, 13 g. of phenols are obtained which consist mainly of brenzcatechin. The total yield of distillable products therefore amounts to 59 g. corresponding to 40 percent of the dry lignin used.

*Example 2*

A mixture is made up containing about 400 g. of such lignin, having a water content of about 42.0 percent, with about 1,000 cc. of water and about 80 g. of Cu-Cr-O (Adkins catalyst; see Adkins and Conner, J. Am. Chem.

Soc. 53 page 1091, 1931). These are heated at about 340° C. in a three-liter autoclave with stirring as in Example 1, for 7 hours under a hydrogen pressure of about 400 atmospheres. After the product has been worked up, as described in Example 1, there are obtained about 91 g. of a distillate which passes over between about 50° and 250° C., at 20 mm. pressure and containing about 76.1 percent phenol. From the aqueous phase there are obtained about 25 g. of substances soluble in ether having a boiling point above about 100° C., these substances consisting mainly of brenzcatechin; that is to say, there is a total of 126 g. of distillable products, corresponding to a 50 percent yield calculated on the lignin.

Example 3

This may start with a mixture of 500 g. Scholler lignin containing about 40 percent of water corresponding to 300 g. of dry lignin, with about 1,000 g. carbolic acid and about 800 cc. water, together with an addition of Cu-chromium-oxide as a catalyst. These, in mixture, with stirring, are heated to about 310° C. under a hydrogen pressure of about 400 atmospheres for about 6 to 7 hours in a 5-liter autoclave in which a stirrer operates. After cooling, there are obtained two layers, an upper aqueous layer, and a lower layer consisting of a homogeneous solution of the reaction product in the carbolic acid from which the catalyst is deposited. From this homogeneous solution, after it has been freed from the catalyst by filtering or centrifuging, and after distillation of the carbolic acid, there are obtained about 180 g. of an oil which distils over between about 200° and 330° C., corresponding to a yield of 60 percent calculated on the dry lignin used. This oil is soluble up to about 70 to 80 percent in caustic soda solution.

Example 4

This example may commence with a mixture of about 1296 g. of evaporated sulphite liquor containing about 204 g. of lignin neutralised with caustic soda; which is preferably heated with about 33 g. of such a catalyst as copper-chromium-oxide (Adkins). The heating may continue for about 6 hours to about 320° C. in an autoclave having a stirrer, and at a hydrogen pressure of about 400 atmospheres. The reaction product which is deposited on cooling consists of a viscous tar and a clear aqueous solution. The product mixture is worked up similarly to that in Example 1; and there are obtainable from it about 52 g. of a phenolic oil as a distillate from the tarry mass when boiling between about 65° and 220° C. at a pressure of 2 mm. Hg, and there may remain 19 g. of substances soluble in alkali from the aqueous solution. The distillable products amount altogether to about 71 g. and the yield is about 34.8 percent as based on the amount of lignin used.

Example 5

Beginning with about 1620 grams of evaporated sulphite liquor containing lye and about 222 g. lignin, and neutralised with caustic soda, these are heated, preferably after the addition of about 71 g. of copper chromate precipitated on Kieselguhr as a catalyst, and in a three liter autoclave having a stirrer, the heating being continued for about six hours, and at a hydrogen pressure of about 400 atmospheres, to a temperature of about 320° C.

On working up the product in the manner previously described there are obtained about 75 g. of distillable fractions, corresponding to a yield of about 33.8 percent on the lignin used.

Example 6

This last described example follows generally the previous ones, but with substantial variations in elements, combinations, and steps.

With this example is presented a flowsheet, the single figure being a diagram of apparatus elements, marked with reference numbers and legends to aid the understanding of the invention.

The process may commence with providing a mixture consisting of about 1 part of dry lignin, 5 parts of water and catalyst as in previous examples. This mix is stirred in a stirring vessel 1 and is pumped by an injection pump 2 by which it is fed to the lower end of a heated vertical contact tube 3 at the rate of about 0.5 percent liters of mixture per hour. A jacket 14 for the tube 3 may both insulate it and electrically provide the heat.

Hydrogen, which has been pre-heated to about 300 to 400° C., in a pre-heater 11, is supplied by a pump 9 and at the same time to the contact tube, so that the liquid and gas may flow and ascend under a pressure of 700 atmospheres through the contact tube 3 from bottom to top, the temperature of the tube being maintained by the heating jacket 14 at about 300 to 400° C.

The reaction mixture, including the heated gases and liquids and the hydrogen gas, rise and flow out of the upper end of the tube 3. These gases and the liquids enter a separator column 4 which collects the descending liquid fractions, while the gas is drawn up and flowed through a cooler 5, within which some volatile liquid fractions are deposited and flow back into the separator. The liquid reaction products together with the catalyst descend and are discharged from the flow path to the outside, by way of an intermediate discharge vessel 6.

On its passage from the cooler 5 the gaseous products pass to a circulating pump 9 but the gas is first passed through a second or after-cooler 7, followed by a stripper 8. The gases are thus freed from any volatile substances still remaining present. A part of the gases purified in this way is expanded or released at 12 and is returned or replaced at 13 by fresh hydrogen which, with the unconsumed hydrogen, is returned to circulation. The amount of gas in circulation is measured by the scale 10 and may amount to about 70 liters per hour.

It is believed that the preamble, the body of the specification, the claims and the drawings disclose fully the novelty and utility of the invention. In one aspect the invention may be considered as the combining of some or all of the steps into the entire process. Important steps and combinations include: The method is adapted to decompose lignin for various purposes, and is performed at high temperatures and pressures, as disclosed. The catalyst may be of the hydrogenation kind, such as Cu-Cr-O. The lignin is treated with hydrogen in neutral suspension, e. g. at 300° C. and 350 atmospheres. The steps are continued until there have been taken up e. g. 0.9 to 1.8 mol of H.

More specifically the features include that the catalyst is formed by reducing a copper chromate precipitated on to the lignin; the lignin used is that of Scholler; a phenol is added to the aqueous suspension; the distillable reaction products are added to the aqueous suspension.

The reference numbers used in the above specification are applied to the parts 1 to 14 appearing on the drawing, as follows:

1. Stirring vessel; (stirred by hand or device)
2. Injection pump; (feeds from 1 to 3)
3. Vertical contact tube; (with upflow)
4. Separator; (to collect liquid fractions from 3)
5. Cooler; (to receive gas portion of flow)
6. Discharge vessel; (for discharge of liquid)
7. After-cooler; (for gas from 5)
8. Stripper; (frees gas from volatiles)
9. Pump; (supplies H to 13 from source)
10. Gas scale; (to measure circulation)
11. Preheater; (for heating the hydrogen)
12. Gas expansion; (place of releasing)
13. Gas replacement; (by fresh H)
14. Heating jacket; (for upflow tube 3)

What is claimed is:

1. The method of decomposing lignin to produce phenolic substances, comprising the steps of precipitating on the lignin copper chromate by the reaction of a copper salt with potassium chromate, heating at a temperature above 300° C. an aqueous neutral suspension of the lignin and the precipitate of copper chromate in the presence of hydrogen under a gaseous pressure above 350 atmospheres for a period between 6 and 7 hours to reduce the copper chromate to copper chromite for hydrogenating catalytic purposes and to produce thereby a tarry mass, separating the copper chromite from the tarry mass, subjecting the tarry product after separation to distillation at about 15 mm. mercury to produce a phenolic oil which boils at a temperature of 100° to 225° C. and which contains alkali soluble fractions, and extracting from said phenolic oil the aqueous layer to obtain phenols.

2. The method of decomposing lignin to produce phenolic substances, comprising the steps of treating an aqueous neutral suspension of lignin containing a Cu-Cr-O hydrogenation catalyst having about 30–50% of copper and about 20–45% of chromium, under hydrogen pressure of about 400 atmospheres and at a temperature of about 340° C. for about 7 hours to produce a tarry mass, separating the catalyst from said mass, distilling the separated tarry mass at a temperature between 50° and 250° C. and at a pressure of about 20 mm. mercury and extracting the aqueous phase in the distillate to obtain substances containing phenols.

3. The method of decomposing lignin to produce phenolic substances, comprising the steps of subjecting an aqueous suspension of Scholler lignin containing carbolic acid and a Cu-Cr-O hydrogenation catalyst having about 30–50% of copper and about 20–45% of chromium, to hydrogen pressure above 350 atmospheres and to temperatures above 300° C. for about 6 to 7 hours while stirring, cooling the resulting product to obtain an upper aqueous layer and a lower layer consisting of a homogeneous solution of the reaction product in the carbolic acid, and subjecting this lower layer to separating action to remove the catalyst and to distilling action to remove the carbolic acid whereby there is obtained a phenolic oil containing a high percentage of phenols.

4. The method of decomposing lignin to produce phenolic substances comprising the steps of treating an aqueous mixture of evaporated sulfite liquor neutralized with caustic soda and containing lignin and a Cu-Cr-O hydrogen catalyst having about 30–50% of copper and about 20–45% of chromium by heating the mixture above 300° C. in the presence of hydrogen under pressure above 350 atmospheres for a sufficient time to hydrolyze and hydrogenate the lignin into a phenolic substance and to produce a tarry substance, cooling the resulting product, and removing the catalyst and the aqueous phase to obtain a substance containing phenols.

5. The method of decomposing lignin to produce phenolic substances comprising the steps of treating an aqueous mixture of evaporated sulfite liquor containing lignin and copper chromate on kieselguhr and neutralized by caustic soda by heating at a temperature above 300° C. in the presence of hydrogen under pressure above 350 atmospheres for a sufficient time to hydrolyze and hydrogenate the lignin into a phenolic substance and to produce a tarry substance, cooling the resulting product and removing the copper chromite formed by reduction of the copper chromate and the aqueous phase to obtain a substance containing phenols.

References Cited in the file of this patent

UNITED STATES PATENTS

| | | |
|---|---|---|
| 1,932,673 | Pier et al. | Oct. 31, 1933 |
| 2,146,655 | Sherrard et al. | Feb. 7, 1939 |
| 2,265,583 | Stevens et al. | Dec. 9, 1941 |
| 2,331,154 | Adkins | Oct. 5, 1943 |
| 2,405,450 | Salvesen et al. | Aug. 6, 1946 |